Aug. 28, 1962 L. O. SCHOTT 3,051,846

NEGATIVE RESISTANCE DIODE PULSE REPEATER

Filed Dec. 27, 1960 2 Sheets-Sheet 1

INVENTOR
L. O. SCHOTT
BY Harry C. Hart
ATTORNEY

Aug. 28, 1962 L. O. SCHOTT 3,051,846

NEGATIVE RESISTANCE DIODE PULSE REPEATER

Filed Dec. 27, 1960 2 Sheets-Sheet 2

INVENTOR
L. O. SCHOTT
BY Harry C. Hart
ATTORNEY

United States Patent Office 3,051,846
Patented Aug. 28, 1962

3,051,846
NEGATIVE RESISTANCE DIODE PULSE REPEATER

Lionel O. Schott, Convent, N.J., assignor to Bell Telephone Laboratories, Incorporated, New York, N.Y., a corporation of New York Filed Dec. 27, 1960, Ser. No. 78,659
8 Claims. (Cl. 307—88.5)

This invention relates to pulse transmission and the regeneration of pulses that may have been degraded in the course of transmission.

Pulse transmission entails the long range propagation of pulse signals along a transmission path. Since the propagated signals become attenuated during their traversals of the path, it is necessary to recurrently restore their amplitudes. This is done through the incorporation into the path, of successive pulse repeaters.

Each repeater is positioned at the end of a prescribed attenuation interval. Usually the repeater is of the regenerative variety for which an incomping pulse signal, exceeding a threshold level, initiates the generation of an outgoing or regenerated pulse signal. With a regenerative repeater, the outgoing signal is substantially unaffected by distortion of the incoming signal and the spontaneous disturbances added to it by the transmission path.

In effect, pulse signals that are regenerated and propagated may be likened to the members of a relay team stationed at intervals along a length of track. Each runner traverses a relay interval and initiates the start of a successor, thus establishing a sequence of operations that continues until all intervals have been traversed.

A regenerative repeater desirably possesses a multistate capability. Typically the repeater is bistate and, as such, is capable of adopting either of two signal states. Initially the repeater is set in an equilibrium signal state by energizing signals and, after being activated by an incoming or regenerating signal, it adopts an alternative signal state for a controlled time duration. It is apparent that a change from one signal state to another should occur rapidly if there is to be minimal disturbance of the information content of the signals being regenerated and if the transmission system is to accommodate high pulse rates.

Since negative resistance devices inherently possess a capability for effecting rapid transitions among a multiplicity of signal states, it is desirable to adapt them for employment in regenerative repeaters. When negative resistance devices are directly incorporated into an extremity-energized transmission path, as in the copending application of S. E. Miller, Serial No. 79,428, filed December 29, 1960, each may be accompanied by cross-coupling paths to assure the forward propagation of its regenerated signals while preventing reverse propagation. In that event, the forwardly propagating pulse signals are of inverted polarity, as compared with the regenerating signals that produce them. If there is to be continuity of propagation, either the repeaters must be alternately inverted or they must be alternately stabilized.

Consequently, it is an object of the invention to provide continuity of propagation in a pulse transmission system, energized at its extremities and constituted of negative resistance repeaters, without requiring either alternate inversions or alternate stabilizations of the repeaters. A related object is to derive, from regenerating signals, diode-regenerated pulse signals that are capable of being propagated without inversion by a pulse transmission system.

Often the transmission path of a pulse transmission system employs but two conductors. Then the use of cross-coupling paths for each repeater to accommodate regenerating and regenerated signals can lead to the introduction of circuit components into both conductors of the transmission path and, as such, render the path incapable of providing coaxial propagation with an equipotential outer conductor. Consequently, it is a further object of the invention to realize a pulse transmission system constituted of negative resistance repeaters that may be contained within a coaxial cable. A concurrent object is to prevent reverse propagation without the need for a cross-coupling path.

The invention is characterized by the incorporation into a transmission path of tandem-connected negative resistance devices that have been shunt-stabilized to adopt substantially identical equilibrium signal states when the path is energized at its extremities. Each negative resistance device displays a current-voltage characteristic with at least one threshold-terminated region of negative resistance.

By requiring that the devices be tandem-connected with respect to energizing signals supplied from the extremities of a transmission path, the invention makes possible the containment of the transmission system within a coaxial cable.

To assure non-inversion of the propagated regenerated pulse signals that are forwardly propagated, the shunt stabilizer of each repeater is bypassed with respect to pulse signals, as well as isolated from the negative resistance device that it stabilizes. Because of the combined isolation and bypassing effects, the negative resistance devices, which are tandem-connected with respect to energizing signals, become shunt connected for regenerated signals in such a way that each of the regenerated signals emanating from a preceding repeater is of the proper polarity to serve as a regenerating signal at a succeeding repeater. When the negative resistance device is a diode, the stabilizing circuit is advantageously a capacitively-bypassed resistor that is inductively isolated from its associated diode.

According to the invention, reverse propagation is prevented without the need for a cross-coupling path through the use of a suppressor in advance of each negative resistance device and incorporated into the transmission path. The suppressor allows unimpeded propagation of regenerating pulse signals while affording substantial impedance to the reverse propagation of regenerated signals. The suppressor is conveniently a unilaterally conducting component, with distinct regions of relative conduction and non-conduction, that is forwardly biased into its conduction region.

That the invention accomplishes the above and related objects will be apparent after the consideration of an illustrative embodiment taken in conjunction with the drawings, in which.

Figure 1:
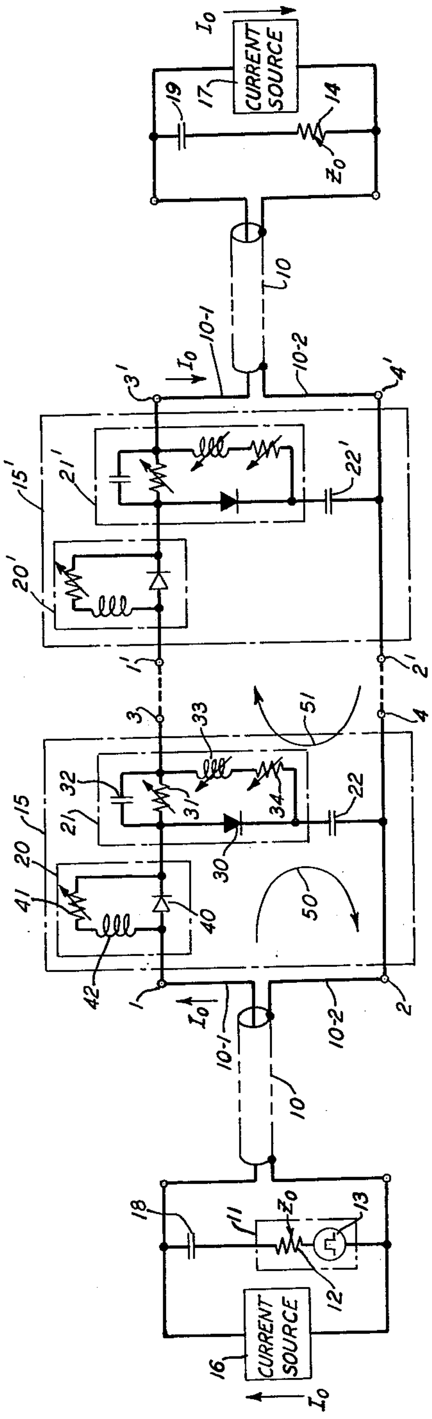
FIG. 1 is a schematic and block diagram of a pulse transmission system constituted of successive repeaters, each employing a voltage controlled diode which is oriented to regenerate attenuated pulse signals and forwardly propagate the regenerated signals without inversion.

Turn now to the pulse transmission system of FIG. 1 showing a dual-conductor transmission path, such as a coaxial-cable 10, that extends between a source 11 of pulse signals, represented by the series combination of a resistor 12 and a voltage source 13, and a load 14. To insure maximum transfer of pulse signal energy, the impedance of the load 14 and that associated with the source 11 are matched to the characteristic impedance $Z_0$ of the path.

While in general the number of repeaters employed in a pulse transmission system depends upon the number of attenuation intervals between the source 11 and its load 14, for simplicity only two such repeaters 15 and 15' are shown in FIG. 1. The repeaters 15 and 15' are four-terminal networks with identical components whose reference numerals are respectively unprimed and primed. This facilitates their manufacture and their incorporation into the coaxial-cable transmission path 10. The path 10 is provided with energizing power supply signals from its extremities by, for example, constant current sources 16 and 17, which are isolated from the pulse source 11 and the load 14 by respective blocking capacitors 18 and 19.

Two of the repeater paths encompass the conduction paths 10–1 and 10–2 of the transmission system. The first of these extends between the first and third terminals 1 and 3 of the repeater 15, for example, and includes, in tandem, a suppressor 20 and a negative resistance regenerative component 21, such as a voltage controlled diode 30 which is shunt stablized by a variable resistor 31, bypassed by a capacitor 32, and isolated from the bypass capacitor 32 by the series combination of a variable inductor 33 and a variable control resistor 34. A second conduction path extends between the second and fourth terminals 2 and 4 of the repeater 15 and is devoid of circuit components. However, the second path is coupled to the regenerative component 21 by a coupling capacitor 22 at the junction of its diode 30 and its control resistor 34.

With regard to the suppressor 20 in advance of the regenerative component 21, it must afford unilateral conduction. Typically the suppressor 20 includes a rectifying diode 40 with a current-voltage characterstic displaying distince regions of conduction and non-conduction. The diode 40 is poled to facilitate the passage of regenerating signals and biased into its conduction region by the bias current $I_0$ and the resulting voltage developed across an adjustable suppressor resistor 41. The suppressor inductor 42, in series with the suppressor resistor 41, confines the passage of pulse signals primarily to the rectifying diode 40.

Figure 2:
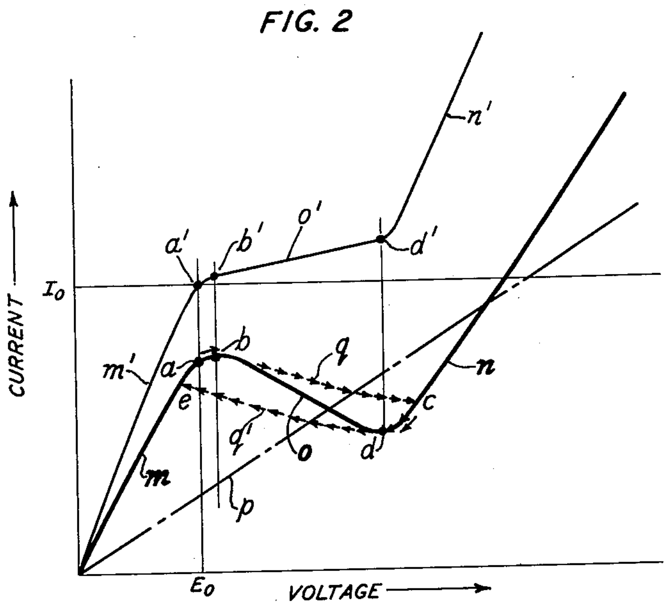
FIG. 2 is a set of characteristic curves explanatory of the operation of each repeater depicted in FIG. 1.

To understand the regenerative action of the repeaters 15 and 15' in FIG. 1, consider the characteristic curve of one such repeater 15 as shown in FIG. 2. The curve attributable to the controlled diode 30 alone displays a first region *m* of positive resistance terminated in a peak threshold *b*, a second region *n* of positive resistance commencing with a valley threshold *d* and an intervening region *o* of negative resistance between the thresholds *b* and *d*. By contrast a typical characteristic curve *p* associated with the stabilizing resistor 31 exhibits a positive resistance throughout. For convenience it is indicated as being entirely linear.

Since the stabilizing resistor 31 and the regenerative diode 30 are connected in shunt, a composite characteristic *m', o', n'* applicable to the first conduction path of the repeater 15 in FIG. 1 is obtained by summing the current ordinates of both the resistor and the diode characteristics *p* and *m, o, n* for each voltage along the axis of abscissas in FIG. 2. To achieve stabilization with respect to the energizing signals, the stabilizing resistor 31 is adjusted until it masks the negative resistance region *o* of the diode 30. This condition is satisfied when the slope of the stabilizing resistor characteristic *p* for a linear resistance is equal to or greater than the slope of the diode characteristic *m, o, n* in its negative resistance region *o*. Then the composite characteristic *m', o', n'* has positive slopes over its entire range, albeit widely different slopes at the different parts of the range.

For regenerative action, the equilibrium operating point of the composite characteristic is set either (1) just below its lower knee *b'*, or (2) just above its upper knee *d'*. Assume that the source 13 of FIG. 1 provides positive-going pulse signals; then the first equilibrium condition is required at point *a'*, for example, and the constant current sources 16 and 17 are adjusted accordingly. Under that circumstance, the diode 30 operates in the first positive resistance region *m* of its characteristic curve *m, o, n* just below the peak threshold *b*, as can be seen from the equilibrium point *a* of the diode characteristic corresponding to the abscissa of the equilibrium voltage $E_0$.

From the standpoint of the regenerative transient effects initiated by pulse signals emanating from the source 13 or from another repeater, the diode equilibrium point *a* may be taken as the origin of the current-voltage coordinates. When a positive-going pulse signal arrives at the repeater 15, a circulating incremental current flows in the loop 50 encompassing the diode 30, the coupling capacitor 22 and the preceding source 13 of regenerating signals. As far as the diode 30 is concerned, its current locus is quickly increased above the peak threshold *b* in FIG. 2, whereupon regeneration is initiated and the current locus undergoes a substantially instantaneous excursion to the second region *n* of positive resistance along a resultant transient load line *q*.

Figure 3:
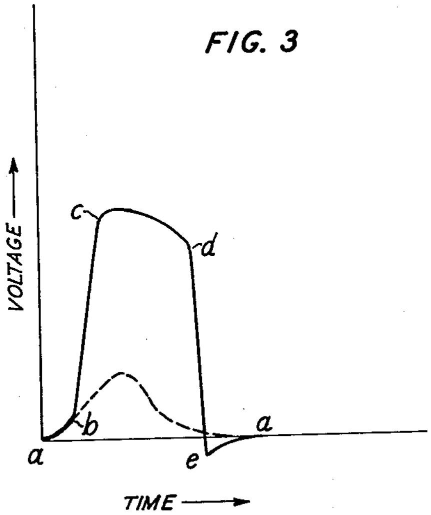
FIG. 3 is a diagram of typical waveforms for regenerating and regenerated pulse signals associated with each repeater of FIG. 1.

The relationship between the regenerating and the regenerated pulse signals developed across the diode 30 is indicated in FIG. 3 by respective dashed-line and solid-line waveforms whose lettered markers correspond with similar markers on the closed-loop locus of FIG. 2.

Once regeneration commences the regenerated pulse signal is independent of the regenerating signal which initiates it, and the regenerated signal undertakes to propagate in both forward and reverse directions along the transmission path 10 of FIG. 1. During the initial reverse propagation, the suppressor diode 40, being biased into its conduction region, has no effect on the reverse propagation with the result that the initial portion of the transient load line *q* has a reciprocal slope which corresponds to an impedance obtained by parallelling the characteristic impedance $Z_0$ with itself to account for the impedance effects seen in both the reverse and the forward directions of propagation. As the rectifying diode 40 is driven progressively into its non-conduction region, the suppressor 20 becomes increasingly effective until the transient impedance in the reverse propagation direction becomes substantially infinite and provides complete suppression, whereupon the reciprocal slope of the final portion of the transient load line *q* in FIG. 2 corresponds to the characteristic impedance $Z_0$ seen in the forward direction of propagation alone. The gradual change that takes place in the transient impedance is indicated in FIG. 2 by the concavity associated with the load line *q*. This change is desirable since it results in a greater magnitude for the forwardly propagated pulse signal than would exist in the absence of suppression. Thus, the suppressor, in addition to suppressing the reverse propagation, also serves the supplementary function of enhancing the magnitude of the forwardly propagated pulse signals. After the locus reaches the second region *n* of positive resistance at point *c*, the rate of channge of the diode current is decelerated because of the effect of the isolating inductor 33. As a result of the decay in the inductor current, a voltage is developed that forces the operating locus of the controlled diode 30 below the valley threshold *d*. Thereupon, the locus follows a transient load line *q'* comparable to that previously described until it reaches the first region *m* of positive resistance at point *e*. Ultimately the locus returns to the initial equilibrium position *a* from which the transient signal changes began.

Again a comparison may be made between the solid-line regenerated waveform of FIG. 3 and the closed loop locus of FIG. 2. The duration of the regenerated pulse signal is determined by the duration of the locus in the second region $n$ of positive resistance. This, in turn, is controlled by the time constant of the regenerative component 21 in FIG. 1 and regulated by an adjustment of the control resistor 34. It is to be noted that the effect of the control resistance was neglected in the derivation of the composite characteristic $m'$, $o'$, $n'$ in FIG. 2. When the resistive magnitude of the control resistor 34 becomes appreciable, it is necessary to obtain an intermediate composite characteristic (not shown), before deriving the composite characteristic $m'$, $o'$, $n'$ in the manner discussed previously, by summing the voltage abscissas of the control resistance characteristic (not shown) and of the diode characteristic $m$, $o$, $n$ for each current along the axis of ordinates.

Regarding the regenerated signal, it, of course, cannot propagate toward the source 13 because the suppressor 20 disengages the regenerative component 21 from the preceding portion of the transmission path 10. But, because of the concerted effects of the bypass capacitor 32 and the coupling capacitor 22, the diode 30 of the regenerative component 21 shunts the conducting paths 10–1 and 10–2 of the succeeding portion of the transmission path 10. As a result, the regenerated signal, which is prevented from being short-circuited by the isolating inductor 33, is applied, without being inverted in polarity, in a circuit, indicated by the second loop 51 of FIG. 1, that includes a succeeding repeater, such as repeater 15'.

Consequently, the regenerated pulse signal produced at each repeater propagates to a succeeding repeater where it serves as a regenerating signal. This sequence of operations continues for each pulse signal originating at the source until it is, in essence, delivered to the load.

Related adaptations of negative resistance devices for the forward propagation, along a transmission path, of regenerated pulse signals that are non-inverted, as well as techniques for stabilizing the devices and preventing reverse propagation, along with ways for providing the devices with energizing signals at the extremities of the transmission path will occur to those skilled in the art.

What is claimed is:

1. A pulse repeater in a dual-conductor transmission path interconnecting a source of signals with a load, which repeater comprises negative resistance means having a threshold signal level, means for including said negative resistance means in one of the conductors of said path for steady signals supplied by said source, and means for interconnecting the conductors of said path through said negative resistance means for pulse signals supplied by said source, whereby advancing pulse signals exceeding said threshold level are regenerated and forwardly propagated to the load with enhanced energy derived from said steady signals.

2. A pulse repeater in a transmission path interconnecting a source of signals and a load, which repeater comprises means, including in the path and energized by steady signals supplied from the source, having a current-voltage characteristic with a threshold-terminated region of negative resistance, means for bypassing said negative resistance means for pulse signals, means for isolating said negative resistance means from said bypassing means, and means for confining the forward propagation of regenerating pulse signals from said source to said negative resistance means, whereby said regenerating pulse signals, exceeding said threshold level, cause said negative resistance means to generate outgoing pulse signals which are applied to said path through said bypassing means with the same polarity as said regenerating pulse signals.

3. Apparatus for regenerating, at selected positions along paired and biased conduction paths, propagated pulse signals that become attenuated while traversing the paths in a forward direction and for suppressing propagation of the regenerated pulse signals in a backward direction, which apparatus comprises, at each selected position, suppressor means comprising a rectifying diode connected in shunt with the series combination of an inductor and a resistor, regenerative means comprising the parallel combination of a capacitor and a resistor connected in shunt with a series combination of a voltage-controlled negative resistance diode and an inductor, said suppressor means and said regenerative means being tandem-connected and included in one of the conduction paths with their diodes poled in the forward propagation direction of the propagated pulse signals, and means, presenting a negligible impedance to the passage of attenuated pulse signals, for coupling the other of the conduction paths to the junction of said voltage-controlled diode and said inductor.

4. In a system for the transmission of signals from a source to a load, apparatus which comprises negative resistance means, means responsive to a signal of a first kind originating at the source causing said negative resistance means to operate in tandem with the source and the load, and means responsive to a signal of a second kind originating at said source causing said negative resistance means to operate in shunt with both said source and said load.

5. Apparatus as defined in claim 2 further including means positioned in the transmission path in advance of said regenerative means for suppressing the reverse propagation of said signals, which comprises rectifying means poled in the direction of forward propagation and having a current-voltage characteristic with distinct regions of relative conduction and non-conduction, means for biasing said rectifying means into said conduction region, whereby the reverse propagation of said regenerated pulse signals, driving said rectifying means into said non-conduction region, is substantially suppressed without hindrance to the forward propagation of the pulse signals originating at said source.

6. Apparatus for regenerating, at selected positions along paired and biased conduction paths, propagated signals that become attenuated while traversing paths in a forward direction, which comprises regenerative means comprising the series combination of negative resistance means and first reactive means connected in shunt with second reactive means, said regenerative means being included in one of the conduction paths, and means presenting a negligible impedance to the passage of attenuated signals for coupling the other of the conduction paths to the junction of said negative resistance means and said first reactive means.

7. Apparatus for regenerating, at selected positions along paired and biased conduction paths, propagated signals that become attenuated while traversing the paths, which comprises a negative resistance device at each selected position, means for operating the devices in tandem for biasing signals, and means responsive to the attenuated signals reaching each selected position for causing the device at that position to operate in shunt with the others.

8. A four-terminal signal repeater which comprises a negative resistance means connected to the first terminal, first reactive means interconnecting said negative resistance means with the second terminal, second reactive means interconnecting said negative resistance means jointly with the third and fourth terminals and third reactive means interconnecting said first and second terminals.

References Cited in the file of this patent

UNITED STATES PATENTS 2,585,571 Mohr ---------------- Feb. 12, 1952